United States Patent Office 3,394,161
Patented July 23, 1968

3,394,161
1,1,3 - TRIPHENYL - 3 - METHYL - DISILOXANES HAVING HYDROLYZABLE GROUP IN THE 1 AND 3 POSITIONS
Terry G. Selin, Schenectady, N.Y., assignor to General Electric Company, a corporation of New York
No Drawing. Original application Nov. 1, 1962, Ser. No. 234,882, now Patent No. 3,231,575, dated Jan. 25, 1966. Divided and this application June 21, 1965, Ser. No. 478,780
4 Claims. (Cl. 260—448.2)

This application is a division of my application Ser. No. 234,882, filed Nov. 1, 1962, now U.S. Patent 3,231,-575 entitled, "Disiloxanes."

This invention is concerned with a certain class of disiloxanes. More particularly, this invention is directed to a new class of materials comprising (A) a disiloxane in which each silicon atom contains a silicon-bonded hydrolyzable group, which material will be referred to hereafter as a "dihydrolyzable disiloxane" and which has the formula:

(1)     $$\begin{array}{cc} C_6H_5 & CH_3 \\ | & | \\ XSi-O-SiX \\ | & | \\ C_6H_5 & C_6H_5 \end{array}$$

where X is a hydrolyzable group, (B) 1-methyl-1,3,3-triphenyldisiloxanediol-1,3 having the formula:

(2)     $$\begin{array}{cc} C_6H_5 & CH_3 \\ | & | \\ HO-Si-O-Si-OH \\ | & | \\ C_6H_5 & C_6H_5 \end{array}$$

and (C) an amine complex of the disiloxanediol of Formula 2 having the formula:

(3)     $$\begin{array}{cc} C_6H_5 & CH_3 \\ | & | \\ HO-Si-O-Si-OH \cdot Z \\ | & | \\ C_6H_5 & CH_3 \end{array}$$

where Z is an organic amine moiety consisting of carbon, hydrogen and nitrogen atoms, the said amine being selected from the class consisting of primary, secondary and tertiary amines.

The dihydrolyzable disiloxanes of Formula 1 are prepared by effecting reaction between a dihydrolyzable diphenylsilane having the formula:

(4)     $$\begin{array}{c} C_6H_5 \\ | \\ X-Si-X \\ | \\ C_6H_5 \end{array}$$

and a dihydrolyzable methylphenylsilane having the formula:

$$\begin{array}{c} CH_3 \\ | \\ X-Si-X \\ | \\ C_6H_5 \end{array}$$

where X is a hydrolyzable group.

Illustrative of the hydrolyzable groups represented by X in Formulae 1, 4 and 5 are, for example, halogen atoms, e.g., chlorine, bromine, etc.: alkoxy radicals, preferably lower alkoxy radicals, such as methoxy, ethoxy, propoxy, butoxy, isobutoxy, heptoxy, etc. radicals; acyloxy radicals, e.g., acetoxy, propionoxy, etc. radicals; as well as other hydrocarbonoxy radicals such as phenoxy, diphenoxy, tolyloxy, etc. radicals. In the preferred embodiment of my invention, the hydrolyzable groups represented by X in the dihydrolyzable disiloxane of Formula 1 and the silanes of Formula 4 or Formula 5 are all the same radical. However, it should be understood that the several hydrolyzable groups attached to silicon in the dihydrolyzable disiloxane of Formula 1 can be different. In the preferred specific embodiment of my invention, the hydrolyzable groups represented by X in Formula 1 are both chlorine, yielding the compound 1,3-dichloro-1-methyl-1,3,3-triphenyldisiloxane.

Illustrative of the various dihydrolyzable diphenylsilanes within the scope of Formula 4 which can be employed in preparing the compounds of the present invention are, for example, diphenyldichlorosilane, diphenyldimethoxysilane, diphenylmethoxychlorosilane, diphenyldiacetoxysilane, etc. Illustrative of the methylphenyl dihydrolyzable silanes of Formula 5 are, for example, methylphenyldichlorosilane, methylphenylmethoxychlorosilane, methylphenyldiacetoxysilane, methylphenylmethoxyacetoxysilane, etc. It will, of course, be apparent to those skilled in the art, that the silicon-bonded hydrolyzable groups represented by X in Formula 1 are dependent upon the silicon-bonded hydrolyzable groups represented by X in the dihydrolyzable diphenylsilane of Formula 4 and the hydrolyzable groups represented by X in the dihydrolyzable methylphenylsilane of Formula 5.

Illustrative of the dihydrolyzable disiloxanes of Formula 1 in addition to the 1,3-dichloro-1-methyl-1,3,3-triphenyldisiloxane already mentioned are, for example, 1,3-dimethoxy - 1 - methyltriphenyldisiloxane, 1,3 - diacetoxy-1 - methyl - 1,3,3 - triphenyldisiloxane, 1 - chloro - 3-acetoxy-1-methyl-1,3,3-triphenyldisiloxane, etc.

In preparing the dihydrolyzable disiloxanes of Formula 1, the dihydrolyzable diphenylsilane of Formula 4 and the dihydrolyzable methylphenylsilane of Formula 5 are merely mixed together and partially hydrolyzed to form the disiloxane. While the conditions under which this hydrolysis is effected can vary within extremely wide limits, it has been found best to use equimolar amounts of the two components. Also in order to facilitate the reaction between the diphenylsilane of Formula 4 and the methylphenylsilane of Formula 5, it is preferred to effect the reaction in the presence of a suitable solvent. Any solvent which dissolves both of the reactants and is inert to the reactants under the conditions of the reaction is satisfactory. Typical suitable solvents include, for example, ether, tetrahydrofuran, acetone, benzene, toluene, xylene, mineral spirits, and the like.

In order to hydrolyze the silicon-bonded hydrolyzable groups represented by X in Formulae 4 and 5, it is apparent that water should be added to the reaction mixture. The amount of water employed is 0.5 mole water per mole of total dihydrolyzable silanes of Formula 4 and Formula 5. In order to increase the rate of the hydrolysis and condensation reaction which forms the dihydrolyzable disiloxanes of Formula 1, it is often advantageous to use elevated temperatures, such as temperatures of the order of 50 to 90° C., although satisfactory reaction is effected at temperatures as low as 0° C. The desired dihydrolyzable disiloxane of Formula 1 is isolated from the reaction mixture by fractional distillation.

The dihydrolyzable disiloxanes of Formula 1 are useful in a number of applications. For example, these materials can be applied to the surface of paper, textiles, ceramics and the like, and exposed to atmospheric moisture to render the surfaces hydrophobic. In addition, these materials can be applied to the surface of various fillers to render the fillers hydrophobic and these materials are of special utility in the preparation of certain filled plastic materials. However, the primary utility of the dihydrolyzable disiloxanes of Formula 1 is in the preparation of the disiloxanediols of Formula 2.

The conversion of the dihydrolyzable disiloxanes of Formula 1 to the disiloxanediol of Formula 2 is effected by hydrolyzing the two hydrolyzable groups in the compound of Formula 1 to a silicon-bonded hydroxyl groups. This is accomplished by mixing the dihydrolyzable disiloxane of Formula 1 with the stoichiometric amount of water required for the hydrolysis and isolating the disiloxanediol of Formula 2 from the reaction mixture. The stoichiometric amount of water required for the reaction is 2 moles of water per mole of the dihydrolyzable disiloxane. The nature of the reaction mixture after reaction is, of course, a function of the particular dihydrolyzable disiloxane employed as a starting material. Where the dihydrolyzable disiloxane contains silicon-bonded alkoxy groups, the reaction mixture contains both the disiloxanediol of Formula 2 and the alcohol corresponding to the alkoxy group. Likewise, when the groups represented by X in Formula 1 are acetoxy radicals, the reaction mixture contains acetic acid. Similarly, where the silicon-bonded hydrolyzable groups represented by X in Formula 1 are halogen, such as chlorine, the resulting reaction mixture contains a hydrogen halide such as hydrogen chloride.

In order to facilitate the preparation of the disiloxanediol of Formula 2 from the dihydrolyzable disiloxane of Formula 1, it is often desirable to effect reaction in the presence of a suitable solvent. Suitable solvents are those which will dissolve the reactants and the reaction products but which are inert under conditions of the reaction. Suitable solvents include ether, acetone, tetrahydrofuran, benzene, toluene, xylene, etc. Where a solvent is used, it is generally employed in the ratio of from about 20 to 2000 parts by weight based on the weight of the other components of the reaction mixture.

In the preparation of the disiloxanediol from dihalodisiloxanes within the scope of Formula 1, it is often desirable to effect the reaction in the presence of a suitable hydrogen halide acceptor. The hydrogen halide acceptor is most conveniently an amine such as aniline or pyridine. The hydrogen halide acceptor is employed in an equimolar amount with respect to the gram atoms of silicon-bonded halogens in the disiloxane of Formula 2. Thus, for example, when 1,3-dichloro-1-methyl-1,3,3-triphenyldisiloxane is employed as a reactant in the amount of 1 mole, the halogen halide acceptor, such as aniline or pyridine, is employed in an amount of 2 moles. Where a hydrogen halide acceptor is employed, the reaction mixture will contain the hydrochloride of this acceptor in the form of a precipitate which is filtered from the reaction mixture and as in the case with any of the reactions conducted in the presence of a solvent, the filtrate is then stripped to remove solvent, resulting in the disiloxanediol of Formula 2.

It is often found that the disiloxanediol of Formula 2 first is present in liquid form. However, after standing or after being seeded, the crystalline form of the disiloxanediol appears. These are white crystals having a melting point of about 90 to 92° C.

The 1-methyl-1,3,3-triphenyldisiloxanediol-1,3 of Formula 2 has a number of uses. One extremely important use of this material is as an additive for silicone rubber compounds. Thus, as shown in Patent 2,890,188, Konkle et al., silicone rubber compounds containing reinforcing fillers often develop a "structure" on standing which makes them difficult to mold into the desired shapes. By adding the disiloxanediol of Formula 2 to such a silicone rubber compound in the amount of from about 1 to 10% by weight, based on the weight of the organopolysiloxane in such silicone rubber, the tendency of such silicone rubber compound to "structure" is markedly reduced, thereby vastly increasing the shelf life of silicone rubber compounds and eliminating the need for "freshening" these materials.

Another extremely important use of the disiloxanediol of Formula 2 is in the preparation of the amine complexes of Formula 3. The amine complexes of Formula 3 can be formed by simply preparing a solution of the disiloxanediol of Formula 2 with the desired amine in a suitable solvent. A wide variety of amine complexes can be prepared by this technique. It is, of course, apparent that the amine moiety of the amine complex is derived from the amine which is reacted with the disiloxanediol of Formula 2. Among the amines which can be employed in the practice of the present invention are primary, secondary or tertiary amines, which may be either aliphatic or aromatic amines. Included within these amines are cyclic aliphatic amines in which nitrogen is part of the ring. Among the primary, secondary and tertiary amines which can be employed are those having the general formula:

(6) 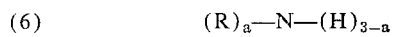

where $a$ is a whole number equal to from 1 to 3 and R is a monovalent hydrocarbon radical selected from the class consisting of alkyl radicals, e.g., methyl, ethyl, propyl, isobutyl, butyl, dodecyl, etc. radicals; aryl radicals, e.g., phenyl, biphenyl, naphthyl, etc. radicals; aralkyl radicals, e.g., benzyl, phenylethyl, etc. radicals; alkaryl radicals, e.g., tolyl, xylyl, ethylphenyl, etc. radicals; alkenyl radicals, e.g., vinyl, allyl, methallyl, etc. radicals. Among the primary, secondary and tertiary amines which can be employed corresponding to Formula 6 are, for example, trimethyl amine, triethyl amine, tripropyl amine, dimethyl amine, diethyl amine, diphenyl amine, tribenzyl amine, cyclohexyl amine, etc.

Another class of amines which may be employed are those having the formula:

(7) 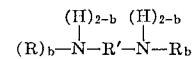

where $b$ is a whole number equal to from 0 to 2, inclusive, R is as previously described and R' is a divalent hydrocarbon radical of either the aliphatic or aromatic series. Among such divalent radicals can be mentioned, for example, the methylene radical, the ethylene radical, the propylidine radical, the phenylene radical, etc. Among such compounds can be mentioned, for example, methylene diamine, N,N'-dimethylethylenediamine, ethylenediamine, the three isomers of phenylenediamine, N,N,N',N'-tetramethylethylenediamine, etc.

Among the cyclic amines in which nitrogen is part of the ring structure may be mentioned, for example, pyridine, pyrrole, quinoline, isoquinoline, picoline, lutidine, collidine, etc.

In preparing the amine complex of Formula 3 from the disiloxanediol of Formula 2 and one of the amines previously described, the proportions of the disiloxanediol and amine can vary within wide limits. However, it is preferred to have the amine present in an amount equal to at least one mole, e.g., from 1.0–3.0 moles, per mole of the disiloxanediol. The amount of solvent which is employed in preparing the amine complex can also vary within extremely wide limits, with it being preferred for economic reasons, to use relatively low proportions of solvent, e.g., from about 5 to 10 parts by weight solvent per part by weight of the other components of the reaction mixture. However, no disadvantage is obtained from employing the solvent in an amount equal to up to several hundred parts by weight based on the number of parts of the other reactants. Suitable solvents for the reaction include, for example, ether, various ketones such as acetone and methylbutyl ketone, hexane, cyclohexane, benzene, toluene, xylene, mineral spirits, etc.

The reaction between the amine and the disiloxanediol is sufficiently rapid at room temperature so that there is no need to heat the reaction mixture. However, no disadvantage is observed from reacting the amine with the disiloxanediol at temperatures of from about 15 to 85° C. or higher. It is generally found that the amine complex of Formula 3 will precipitate after standing from the reaction mixture in which it is formed and this property is used to separate the desired product. After the amine complex precipitates from the reaction mixture, it is washed several times with a suitable solvent and dried to produce the amine complexes within the scope of the present invention.

Among the many complexes within the scope of the present invention, the pyridine complex of the disiloxanediol is the preferred species because of its ease of formation. This preferred species has the formula:

(8)

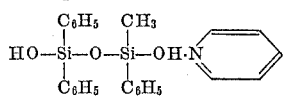

This material is a white crystalline solid having a melting point of from 60 to 63° C.

The following examples are illustrative of the practice of my invention and are not intended for purposes of limitation.

Example 1

1,3-dichloromethyltriphenyldisiloxane was prepared by charging a reactor with 1265 grams (5.0 moles) of diphenyldichlorosilane, 191 grams (1.0 mole) phenylmethyldichlorosilane and 1000 ml. toluene. The mixture was heated at 80° C. with stirring for 2 hours, during which time 764 grams (4.0 moles) of additional phenylmethyldichlorosilane and 96 grams (5.0 moles) water were slowly added. The mixture was stirred for an additional ½ hour and allowed to cool for approximately 16 hours. The reaction mixture was stripped at atmospheric pressure to remove the toluene and then fractionally distilled to yield the desired product which had a boiling point of 164 to 165° at 0.2 millimeter. Chemical analysis of this material showed the presence of 18.18% chlorine as compared with the theoretical calculated value of 18.25%. This material was a clear, colorless liquid having the formula:

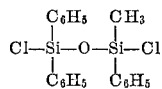

Example 2

To a reaction vessel was charged 300 ml. ether, 3.6 grams (0.2 mole) of water, 18.6 grams (0.2 mole) aniline and 75 grams of acetone. This mixture was stirred and cooled to about 0° C. while 39 grams (0.1 mole) of 1,3-dichlorotriphenylmethyldisiloxane (prepared in Example 1) in 80 ml. ether was added dropwise over a one hour period. The mixture was stirred for an additional ½ hour, filtered to remove aniline hydrochloride precipitate and the filtrate was evaporated to dryness to produce 1-methyl-1,3,3-triphenyldisiloxanediol - 1,3 which was a clear, colorless liquid. After being maintained for about 6 weeks at about 5° C., the material had completely crystallized to white crystals having a melting point of 90 to 92° C. Infrared analysis of this product confirmed the presence of silicon-bonded hydroxyl groups, silicon-bonded methyl groups and silicon-bonded phenyl groups. Chemical analysis of this product showed the presence of 64.64% carbon, 5.72% hydrogen, 15.99% silicon and 9.52% hydroxyl groups as compared with the calculated theoretical values of 64.75% carbon, 5.69% hydrogen, 15.91% silicon and 9.5% hydroxyl groups. These data establish that the product was 1-methyl-1,3,3-triphenyl-disiloxanediol-1,3.

Example 3

Eight grams (0.023 mole) of the disiloxanediol prepared in Example 2 was dissolved in a mixture of 25 ml. benzene and 3 grams (0.038 mole) pyridine. The resulting solution was poured slowly into 125 ml. purified hexane and two liquid phases resulted. After being maintained for about 16 hours at about 5° C., the lower liquid phase had been changed to white needle-like crystals. The crystals were filtered from the liquid and washed several times with hexane and dried under a stream of nitrogen. This product had a melting point of 60 to 63° C., and contained 66.63% carbon, 5.76% hydrogen, 12.93% silicon and 3.22% nitrogen as compared with the theoretical calculated values of 66.75% carbon, 5.79% hydrogen, 12.96% silicon and 3.24% nitrogen. Chemical analysis also indicated the pyridine content of this product to be 18.2% by weight as compared with the theoretical value of 18.3%, establishing that the product was the equimolar complex between the disiloxanediol of Example 2 and pyridine. This complex was the preferred species of Formula 8.

Example 4

Following the general procedure of Example 1,1,3-dimethoxy-1-methyl-1,3,3-triphenyldisiloxane is prepared by charging 2 moles of diphenyldimethoxysilane and 2 moles methylphenyldimethoxysilane into a reaction vessel containing 500 ml. toluene. The reaction mixture is heated to 50° C. while 2 moles of water are slowly added and the reaction mixture is then allowed to cool. The methanol is removed from the reaction mixture, which is then fractionally distilled to produce the desired product.

Example 5

To a reaction vessel is charged 1 mole of 1,1-dimethoxy-1-methyl-1,3,3-triphenyldisiloxane, 1 mole of water and a mixture of 200 parts ether and 100 parts tetrahydrofuran. After stirring the reaction mixture at 50° C. for 2 hours, the reaction mixture is stripped of solvent and methanol produced in the reaction to yield liquid 1-methyl-1,3,3-triphenyldisiloxanediol-1,3 which, after standing at 0° C. for 4 weeks, crystallizes to white crystals having a melting point of 90 to 92° C.

Example 6

The tributyl amine complex of the disiloxanediol prepared in Example 5 is formed by adding 10 grams of the disiloxanediol to a mixture of 30 ml. benzene and 8 grams tributyl amine. The resulting solution is slowly poured into 150 ml. hexane and two liquid phases result. The reaction mixture is then maintained at a temperature of 0° C. for 16 hours during which time the lower liquid phase changes to white, needle-like crystals, which are filtered from the liquid, washed several times with hexane and dried under a stream of nitrogen to produce the desired complex having the formula:

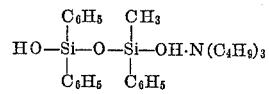

The pyridine complexes within the scope of Formula 3 are especially valuable in producing cyclic diorganopolysiloxanes in which the various silicon atoms contain different substituents. For example, the pyridine complex formed in Example 3 can be reacted with diphenyldichlorosilane to produce the diorganocyclotrisiloxane containing five silicon-bonded phenyl groups and one silicon-bonded methyl group. Alternatively, this complex can be reacted with dimethyldichlorosilane to produce a diorganocyclotrisiloxane in which one of the silicon atoms contains two silicon-bonded phenyl groups, another of the silicon atoms contains two silicon-bonded methyl groups and the third silicon atom contains both a methyl and a phenyl group. Similarly, the complex of Example 3 can be reacted with 1,3-dichlorotetraphenyldisiloxane to produce a diorganocyclotetrasiloxane containing seven silicon-bonded phenyl groups and one silicon-bonded methyl group. The general technique for employing the amine complex of Formula 3 in preparing cyclic diorganopolysiloxanes is described in my joint copending application with Paul I. Prescott, Ser. No. 234,883, now U.S. Patent 3,317,578, filed concurrently herewith and assigned to the same assignee as the present invention. The diorganocyclopolysiloxanes described above can be rearranged and condensed by the use of alkali-metal catalysts, such as potassium hydroxide, to produce linear polydiorganosiloxanes which are convertible to the solid, cured, elastic state and which are generally mixed with a filler and a curing agent, such as an organo peroxide curing agent, and heated at elevated temperatures to form silicone rubber compounds.

Example 7

This example describes the use of the pyridine complex prepared in Example 3 in the preparation of methylpentaphenylcyclotrisiloxane. Into a reaction vessel was charged 2.5 grams (0.0057 mole) of the pyridine complex of Example 3, 0.5 gram (0.006 mole) pyridine and 15 ml. benzene. The reaction mixture was stirred while 1.44 grams (0.0057 mole) of diphenyldichlorosilane was added dropwise over a 10 minute period. After stirring for an additional ½ hour, 25 ml. of water was added to extract any pyridine salts. The benzene layer was washed three times with water, isolated and dried over sodium sulfate. The solvent was removed by stripping at room temperature, yielding 3.1 grams of a crystalline material. This product was recrystallized from 10 ml. ethanol, yielding 2.4 grams of methylpentaphenylcyclotrisiloxane which had a melting point of 111 to 113° C. and which was in the form of small plate-like crystals. The identity of this compound was confirmed by infrared analysis which showed the presence of a doublet at 8.9 microns and a peak at 13.9 microns, corresponding to the diphenylsiloxane units, a peak at 9.8 microns corresponding to the cyclotrisiloxane ring and peaks at 7.9 and 12.5 microns corresponding to the methylphenylsiloxy group. The identity of this compound was further confirmed by a mixed melting point determination with a sample of methylpentaphenylcyclotrisiloxane which had been prepared by reacting tetraphenyldisiloxanediol-1,3 with methylphenyldichlorosilane following the procedure of Christian R. Sporck, application Ser. No. 160,270, filed Dec. 18, 1961, and assigned to the same assignee as the present invention. This mixed melting point was also in the range of from 111 to 113° C.

While the foregoing examples have illustrated a number of embodiments of my invention, it should be understood that the invention is broadly directed to the class of hydrolyzable disiloxanes within the scope of Formula 1, the disiloxanediol of Formula 2 and the various amine complexes within the scope of Formula 3. The preparation of all materials within the scope of Formulae 1 and 3 is effected in the same manner as described for the specific materials illustrated in the examples.

What I claim as new and desire to secure by Letters Patent of the United States is:

1. A disiloxane having the formula:

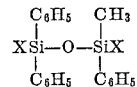

where X is a hydrolyzable group.

2. A disiloxane having the formula:

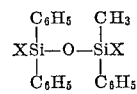

where X is a member selected from the class consisting of halogen, hydrocarbonoxy radicals and acyloxy radicals.

3. The compound 1,3-dichloro-1-methyl-1,3,3-triphenyldisiloxane having the formula:

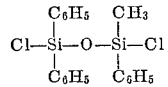

4. The compound 1-methyl-1,3,3-triphenyldisiloxanediol-1,3 having the formula:

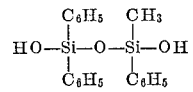

References Cited

UNITED STATES PATENTS 2,258,222  10/1941  Rochow _____ 260—448.2 XR

TOBIAS E. LEVOW, *Primary Examiner.*

P. F. SHAVER, *Assistant Examiner.*